(12) United States Patent
Wu (10) Patent No.: US 9,578,960 B1
(45) Date of Patent: Feb. 28, 2017

(54) SUPPORTING RACK

(71) Applicant: CHEN-SOURCE INC., Taoyuan (TW)

(72) Inventor: Kuan-Yen Wu, Taoyuan (TW)

(73) Assignee: CHEN-SOURCE INC., Taoyuan (TW)

( * ) Notice: Subject to any disclaimer, the term of this patent is extended or adjusted under 35 U.S.C. 154(b) by 0 days.

(21) Appl. No.: 15/142,503

(22) Filed: Apr. 29, 2016

(51) Int. Cl.
| | |
|---|---|
| *A47B 47/00* | (2006.01) |
| *A47B 21/03* | (2006.01) |
| *A47B 21/04* | (2006.01) |
| *A47B 23/04* | (2006.01) |
| *A47B 81/00* | (2006.01) |
| *H05K 7/02* | (2006.01) |
| *H05K 7/18* | (2006.01) |

(52) U.S. Cl.
CPC .......... *A47B 21/0314* (2013.01); *A47B 21/04* (2013.01); *A47B 23/04* (2013.01); *A47B 81/00* (2013.01); *H05K 7/02* (2013.01); *H05K 7/18* (2013.01); *A47B 47/00* (2013.01); *A47B 2200/0066* (2013.01)

(58) Field of Classification Search
CPC ....... A47B 21/04; A47B 23/041; A47B 23/04; A47B 47/00; A47B 21/0314; A47B 81/00; A47B 2200/008; H05K 7/18; H05K 7/02
USPC ........... 211/26, 186, 189; 248/441.1, 346.01; 248/346.02; 108/50.01, 43; D06/406.1–406.5
See application file for complete search history.

(56) References Cited

U.S. PATENT DOCUMENTS

| | | | | | |
|---|---|---|---|---|---|
| 527,108 | A | * | 10/1894 | Cooper | A47B 97/08 108/43 |
| 1,996,515 | A | * | 4/1935 | Howell | A47B 57/40 211/134 |
| 2,003,241 | A | * | 5/1935 | Brown | A47B 23/001 108/131 |
| D132,893 | S | * | 6/1942 | Corbett | D6/406.1 |
| D152,153 | S | * | 12/1948 | Harvey | D6/349 |
| 2,663,603 | A | * | 12/1953 | Newman | A47G 23/0608 108/129 |
| 2,750,705 | A | * | 6/1956 | Keveney | A01K 97/18 108/43 |
| 2,783,109 | A | * | 2/1957 | Frey | A47G 23/0608 108/115 |
| 2,844,429 | A | * | 7/1958 | Frey | A47B 23/002 108/115 |
| 3,439,812 | A | * | 4/1969 | Nagelkirk | F16B 12/20 108/108 |

(Continued)

*Primary Examiner* — Joshua J Michener
*Assistant Examiner* — Devin Barnett
(74) *Attorney, Agent, or Firm* — Muncy, Geissler, Olds & Lowe, P.C.

(57) ABSTRACT

A supporting rack includes two foot members each including a hollow foot member body, a foot member cover covering the hollow foot member body and two binding members bilaterally and detachably fastened to the hollow foot member body to secure the foot member cover in place, two support members vertically adjustably mounted on the respective foot members and locked by the respective binding members, a tabletop detachably supported on the support members and adjustable with the support members relative to the foot members to the desired elevation and defining a receiving space between the two foot members beneath the bottom wall thereof for accommodating computer keyboard, mouse or other peripheral devices.

10 Claims, 7 Drawing Sheets

(56) References Cited

U.S. PATENT DOCUMENTS

| | | | | |
|---|---|---|---|---|
| 3,701,576 A * | 10/1972 | Moen | A47B 23/002 | 108/43 |
| D274,488 S * | 7/1984 | Howitt | D6/406.6 | |
| D281,555 S * | 12/1985 | Levy | D6/406.6 | |
| D282,043 S * | 1/1986 | Morin | D6/406.6 | |
| D282,218 S * | 1/1986 | Catelli | D21/522 | |
| D289,247 S * | 4/1987 | Wang | D6/406.6 | |
| 4,785,742 A * | 11/1988 | Esslinger | A47B 17/02 | 108/101 |
| 4,848,710 A * | 7/1989 | Newman | A47B 21/0314 | 248/125.1 |
| 4,953,473 A * | 9/1990 | Tomaka | A47B 23/001 | 108/127 |
| D319,358 S * | 8/1991 | Giugiaro | D6/406.1 | |
| 5,081,936 A * | 1/1992 | Drieling | B60N 3/002 | 108/25 |
| 5,134,930 A * | 8/1992 | Mei-Hwa | A47B 23/00 | 100/42 |
| D342,842 S * | 1/1994 | Lemon | D12/425 | |
| 5,383,411 A * | 1/1995 | Tomaka | A47B 23/001 | 108/129 |
| D355,786 S * | 2/1995 | Wolff | D6/406.5 | |
| D359,862 S * | 7/1995 | Rousch | D12/419 | |
| 5,443,237 A * | 8/1995 | Stadtmauer | A47B 21/0314 | 248/118.3 |
| 5,520,119 A * | 5/1996 | Eisenberg | A47B 23/002 | 108/43 |
| D377,273 S * | 1/1997 | Amos | D6/406.6 | |
| 5,598,786 A * | 2/1997 | Patterson | A47B 23/001 | 108/43 |
| 5,623,869 A * | 4/1997 | Moss | A47B 23/002 | 108/43 |
| D380,727 S * | 7/1997 | Gilstrap | D12/417 | |
| D383,918 S * | 9/1997 | Prince | D6/406.3 | |
| D385,126 S * | 10/1997 | Howland | D6/406.6 | |
| 5,685,441 A * | 11/1997 | Calfee | A47B 81/06 | 211/188 |
| D390,718 S * | 2/1998 | Howland | D6/406.6 | |
| D391,607 S * | 3/1998 | Russo | D19/78 | |
| 5,769,514 A * | 6/1998 | Brown | A47B 3/08 | 108/129 |
| D399,834 S * | 10/1998 | Calfee | D14/451 | |
| D404,219 S * | 1/1999 | Patterson | D6/406.5 | |
| D405,291 S * | 2/1999 | Yu | D6/406.5 | |
| 5,917,694 A * | 6/1999 | Denny | A45D 1/00 | 206/372 |
| 5,934,638 A * | 8/1999 | Provot | B65D 19/016 | 108/55.1 |
| 6,010,262 A * | 1/2000 | Linyear | A47B 21/0314 | 248/441.1 |
| 6,032,586 A * | 3/2000 | Reyes | A47B 23/041 | 108/25 |
| 6,032,912 A * | 3/2000 | Korn | A47B 47/025 | 211/135 |
| D428,729 S * | 8/2000 | Weitzman | D6/406.5 | |
| 6,170,405 B1 * | 1/2001 | Weitzman | A47B 3/083 | 108/174 |
| 6,220,558 B1 * | 4/2001 | Broder | A47B 21/0314 | 108/57.25 |
| D448,950 S * | 10/2001 | McIveen | D14/451 | |
| D455,025 S * | 4/2002 | Weitzman | D6/406.5 | |
| 6,496,360 B1 * | 12/2002 | Cordes | A47B 23/002 | 108/43 |
| 6,725,784 B2 * | 4/2004 | Crinion | A47B 17/00 | 108/50.01 |
| 7,055,442 B2 * | 6/2006 | Podd | A47B 23/001 | 108/25 |
| 7,096,797 B2 * | 8/2006 | Sharpe | A47B 3/00 | 108/43 |
| D538,289 S * | 3/2007 | Stravitz | D14/451 | |
| 7,252,276 B2 * | 8/2007 | Acketts | A47B 91/005 | 248/188.8 |
| D574,200 S * | 8/2008 | Pearl | D7/698 | |
| D576,168 S * | 9/2008 | Ostroff | D14/447 | |
| D577,361 S * | 9/2008 | Beilstein | D14/447 | |
| D580,920 S * | 11/2008 | Wikel | D14/240 | |
| 7,536,960 B1 * | 5/2009 | Perez | A47B 23/002 | 108/27 |
| D604,063 S * | 11/2009 | Oshinomi | D6/656.16 | |
| D619,822 S * | 7/2010 | Damgaard-Sorensen | D6/406.1 | |
| 7,883,063 B2 * | 2/2011 | Mesfin | F16M 11/04 | 248/123.11 |
| 7,997,211 B2 * | 8/2011 | Peterson | F16M 11/04 | 108/152 |
| 8,051,783 B1 * | 11/2011 | Hoskinson | A47B 37/00 | 108/23 |
| 8,327,774 B1 * | 12/2012 | Rivera | B60N 3/005 | 108/44 |
| D679,520 S * | 4/2013 | Wong | D6/406.5 | |
| 8,465,100 B2 * | 6/2013 | Kim | A47C 16/025 | 297/423.41 |
| 8,528,489 B2 * | 9/2013 | Roy | A47B 3/08 | 108/125 |
| D712,174 S * | 9/2014 | Petersen | D6/406.3 | |
| 8,875,840 B2 * | 11/2014 | Chancler | A47C 9/10 | 182/33 |
| D723,830 S * | 3/2015 | Tcholakov | D6/406.6 | |
| D724,793 S * | 3/2015 | Hansen | D30/118 | |
| 2001/0011441 A1 * | 8/2001 | Jette | H02G 3/285 | 52/220.1 |
| 2002/0050234 A1 * | 5/2002 | Lechman | A47B 21/007 | 108/50.01 |
| 2003/0010260 A1 * | 1/2003 | Chang | A47B 17/00 | 108/50.01 |
| 2003/0189152 A1 * | 10/2003 | Elder | B65D 19/0036 | 248/346.02 |
| 2003/0230691 A1 * | 12/2003 | Shackleton | B65D 25/24 | 248/346.01 |
| 2004/0216645 A1 * | 11/2004 | Lin | A47B 3/08 | 108/50.01 |
| 2004/0237852 A1 * | 12/2004 | Tsai | A47B 21/03 | 108/92 |
| 2004/0261668 A1 * | 12/2004 | Jarke | B82Y 30/00 | 108/43 |
| 2006/0174807 A1 * | 8/2006 | Dral | A47B 21/0073 | 108/50.01 |
| 2008/0282940 A1 * | 11/2008 | Marion | A47B 23/00 | 108/43 |
| 2009/0013908 A1 * | 1/2009 | Grove | A47B 1/05 | 108/159.11 |
| 2010/0186639 A1 * | 7/2010 | Schiava | B29C 51/16 | 108/57.27 |
| 2011/0005433 A1 * | 1/2011 | Pichereau | B62B 3/04 | 108/55.1 |
| 2013/0061781 A1 * | 3/2013 | Wong | B60N 3/002 | 108/3 |
| 2014/0285959 A1 * | 9/2014 | Riley | A47B 21/0073 | 361/679.08 |
| 2014/0319302 A1 * | 10/2014 | Baltz | B65D 19/385 | 248/346.02 |

* cited by examiner

SUPPORTING RACK

BACKGROUND OF THE INVENTION

1. Field of the Invention

The present invention relates to device supporting racks and more particularly to such a supporting rack, which comprises two foot members, two support members vertically adjustably mounted on the respective foot members, and a tabletop detachably supported on the support members and adjustable with the support members relative to the foot members to the desired elevation.

2. Description of the Related Art

With fast development of electronic and multimedia technologies, advanced and sophisticated computer, notebook computer and many other mobile electronic devices have been continuously created and widely used around every corner in our society. Due to the popularization of computers, most people are dependent on computers. Nowadays, people often use a keyboard, mouse and other computer peripheral equipment to provide electrical signals to a computer, enabling the computer to output the content of the electrical signals through a display screen or printer. A display screen is a requisite output device of a computer.

Further, in order to allow the user to watch the display screen at a comfortable angle, a screen rack is generally used to support the display screen, allowing the user to adjust the viewing angle of the display screen according to personal preference.

However, when using a computer system, people generally will position the display screen of the computer system on a desk. When using a screen rack to support the display screen on the desk, the screen rack will occupy much desktop space. In order to save desktop space, a suspension support device may be used to suspend the display screen above the desktop. However, a suspension support device has the drawbacks of installation difficulty and adjustment inconvenience.

There are supporting racks commercially available. These supporting racks can be mounted on a desktop to support a display screen above the desktop with a space defined therein for accommodating keyboard, mouse or other computer peripheral apparatus, saving much the desktop space. These supporting racks may be equipped with computer expansion jacks for the connection of computer peripheral apparatuses. However, these conventional supporting racks are monotonous. Further, these conventional supporting racks do not allow the user to change the design of the outer appearance according to personal preference, making them less attractive to consumers.

Therefore, it is desirable to provide a supporting rack that eliminates the aforesaid drawbacks.

SUMMARY OF THE INVENTION

The present invention has been accomplished under the circumstances in view. It is the main object of the present invention to provide a supporting rack, which comprises two foot members arranged in parallel, two support members vertically adjustably mounted on the respective foot members, and a tabletop detachably fastened to the support members in horizontal. Each foot member comprises a hollow foot member body, a foot member cover and two binding members fastened to the hollow foot member body to secure the foot member cover to the hollow foot member body. The hollow foot member body comprises a plurality of mounting slots transversely located in the top wall thereof, an accommodation chamber defined therein and an opening defined in an inner lateral side thereof in communication with the accommodation chamber. The foot member cover is adapted for covering the opening of the hollow foot member body, comprising a cover base inserted through the opening into the accommodation chamber and a plurality of locating blocks symmetrically extended from two opposite lateral sides of the cover base at different elevations and engaged into the inside of the hollow foot member body. The two binding members are detachably fastened to the hollow foot member body at two opposite sides to secure the foot member cover to the hollow foot member body. The two support members vertically adjustably mounted on the respective foot members, each comprising a base panel suspended above the associating support member, a plurality of mounting portions located at the base panel, two legs respectively and perpendicularly extended from two opposite ends of the base panel and respectively removably inserted through the mounting slots of the hollow foot member body of the respective foot member into the associating accommodation chamber, and two locating tips respectively inwardly extended from respective distal ends of the legs and selectively stoppable at an inner bottom wall of the hollow foot member body of the associating foot member or one respective locating block of the foot member cover of the associating foot member. The tabletop is detachably fastened to the support members in horizontal, comprising a plurality of mating mounting portions bilaterally and symmetrically located on the bottom wall thereof and respectively detachably fastened to the mounting portions of the support members. Thus, the tabletop defines a receiving space between the two foot members beneath the bottom wall thereof for accommodating computer peripheral apparatuses such as computer keyboard, mouse, etc. Because the tabletop is detachably fastened to the support members, the user can replace the tabletop with a different design of tabletop, increasing the applicability of the supporting rack.

Further, the user can detach the two binding members from the respective hollow foot member bodies, and then take the support members out of the respective accommodation chambers of the hollow foot member bodies of the respective foot members, and then lift the support members to the desired elevation and put them back to the inside of the respective accommodation chambers to let the locating tips of the legs of the respective support members be stopped at selected locating blocks at the cover bases of the respective foot member covers, and then fasten the respective two binding members to the hollow foot member bodies of the respective foot members to lock the support members to the respective foot members, thereby supporting the tabletop at the adjusted elevation. Thus, the invention allows adjustment of the elevation of the tabletop relative to the foot members, increasing the applicability of the supporting rack.

Further, a holder member is fastened to one foot member at an outer side. The holder member defines therein a holding chamber for holding a portable electronic device, saving tabletop space. Further, a display screen can be held in the holding chamber of the holder member so that a person can watch the display of the display screen from one lateral side, increasing the applicability of the present invention.

Further, electrical jacks are provided at one foot member for the connection of the cables of various computer peripheral apparatuses and a computer or server, enabling the installed computer peripheral apparatuses to be linked to the computer or server. In application, the computer or server can be placed on the floor, and the supporting rack can be placed on the desk. Thus, the user does not need to bend the body in connecting various computer peripheral apparatuses to the computer or server, and can conveniently connect the cables of various computer peripheral apparatuses to the electrical jacks at one foot member of the supporting rack to establish linking between these various computer peripheral apparatuses and the computer or server. Therefore, the supporting rack of the present invention has the advantages of increased applicability and system expandability, meeting the needs of the market.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Referring to FIGS. 1-4, a supporting rack in accordance with the present invention is shown. The supporting rack comprises two foot members 1, two support members 2 and a tabletop 3.

The foot member 1 comprises a hollow foot member body 11, a foot member cover 12 and two binding members 13. The hollow foot member body 11 comprises a plurality of mounting slots 111 located in a top wall thereof and transversely cut through one side of the top wall, an accommodation chamber 110 defined therein, and an opening 1101 defined in an inner lateral side thereof in communication with the accommodation chamber 110. The foot member cover 12 is mounted in the opening 1101 of the hollow foot member body 11, comprising a cover base 121 engaged into the accommodation chamber 110 and a plurality of locating blocks 1211 symmetrically extended from two opposite lateral sides of the cover base 121 at different elevations and engaged into the inside of the hollow foot member body 11. The two binding members 13 are fastened to the hollow foot member body 11 at two opposite sides to secure the foot member cover 12 to the hollow foot member body 11.

The support member 2 comprises a base panel 21, a plurality of mounting portions 22, for example, mounting through holes 221 located at the base panel 21, two legs 23 respectively and perpendicularly extended from two opposite ends of the base panel 21 in a parallel manner and respectively terminating in a respective locating tip 231.

The tabletop 3 comprises a plurality of mating mounting portions 31, for example, mounting screw holes 311 symmetrically located in a bottom wall thereof at two opposite lateral sides.

The foot member 1 further comprises a plurality of locating holes 112 located in the accommodation chamber 110 inside the hollow foot member body 11. The foot member cover 12 further comprises a plurality of through holes 1212 respectively defined in the locating blocks 1211 of the cover base 121 and respectively affixed to the locating holes 112 of the foot member 1 with screws. The foot member 1 further comprises a first positioning unit 113 located in the accommodation chamber 110 of the hollow foot member body 11, and a second positioning unit 131 located at each binding member 13 for fastening to the first positioning unit 113 to secure the foot member cover 12 and the hollow foot member body 11 together.

Figure 1:
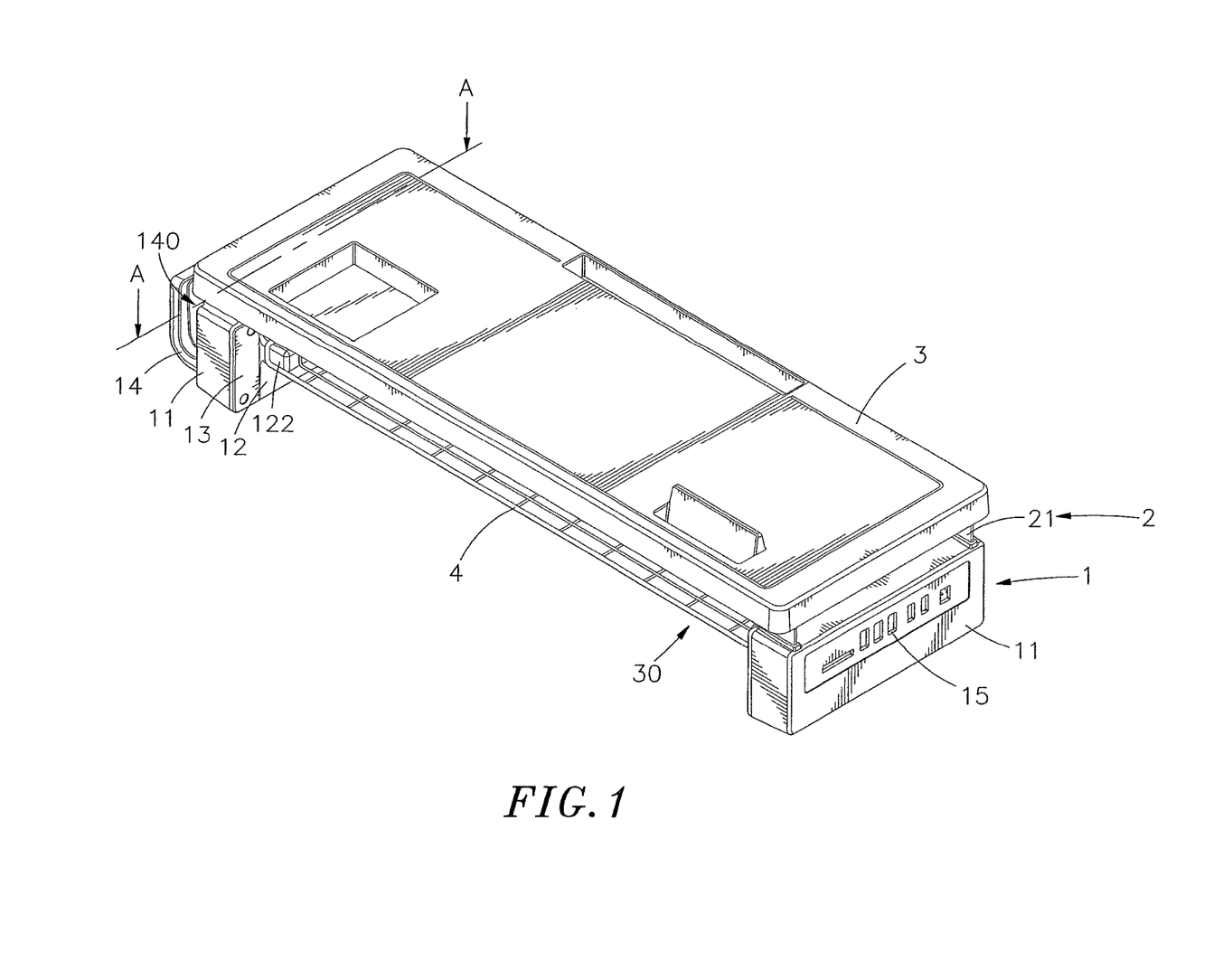
FIG. 1 is an oblique top elevational view of a supporting rack in accordance with the present invention.
Figure 2:
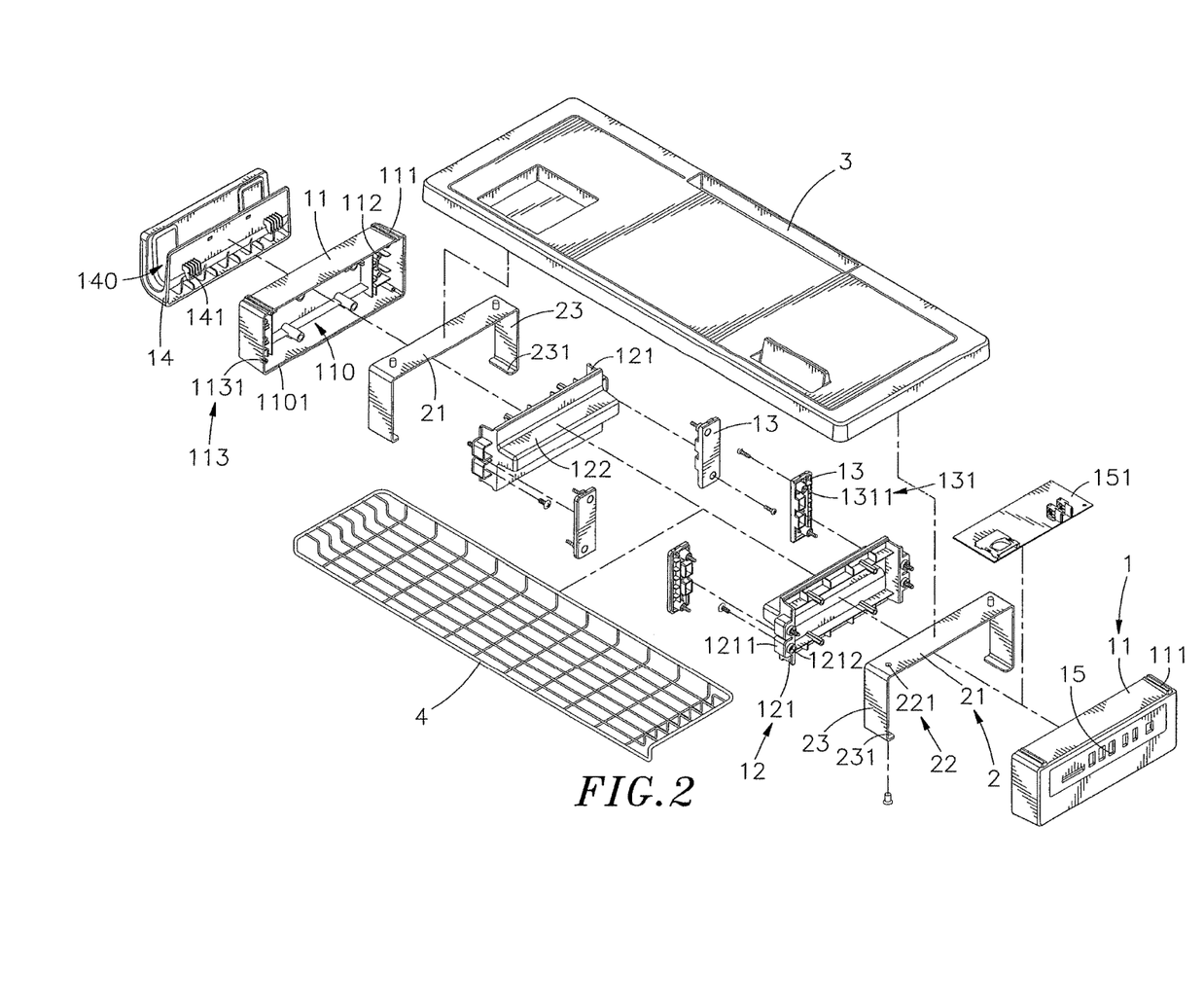
FIG. 2 is an exploded view of the supporting rack in accordance with the present invention.
Figure 3:
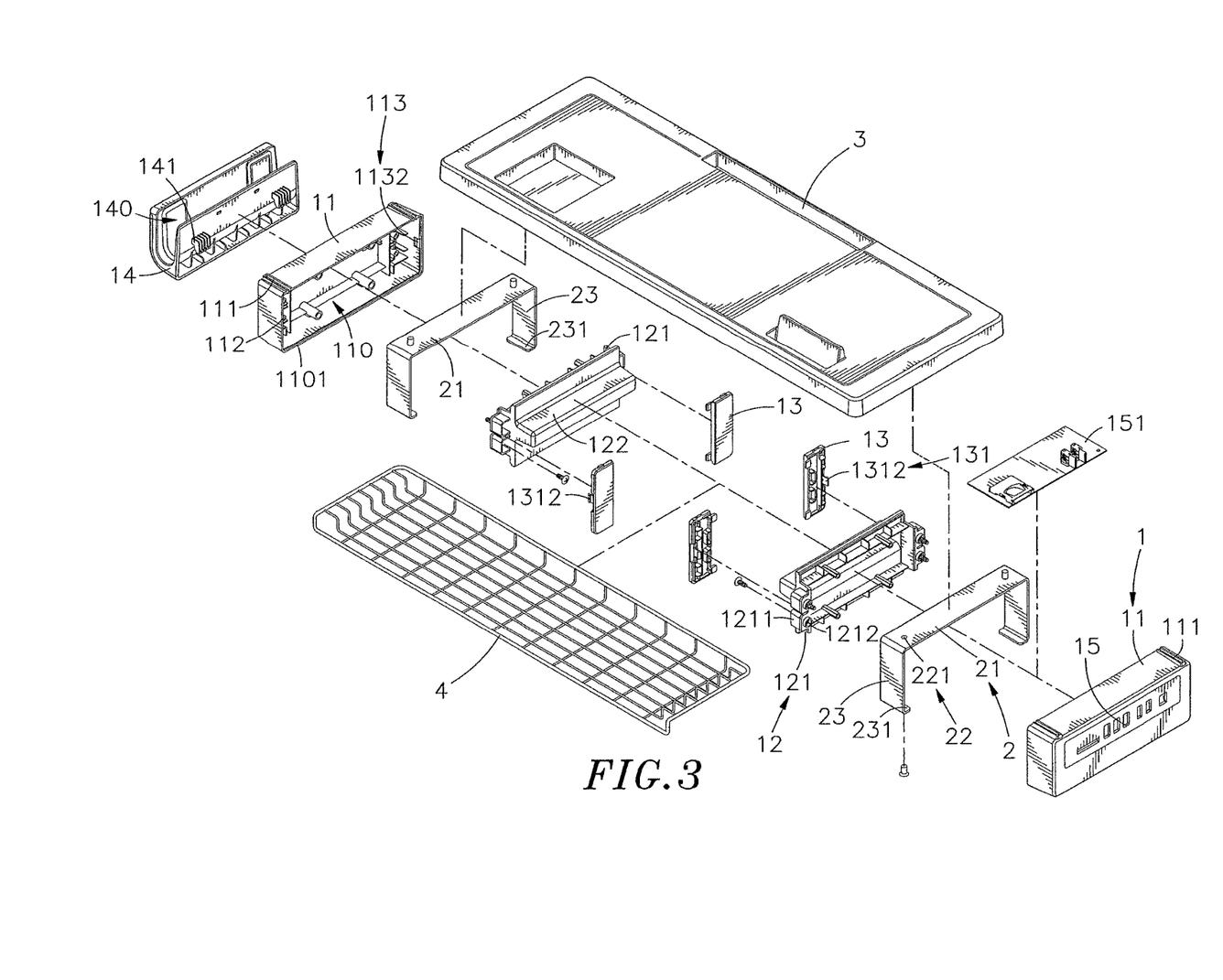
FIG. 3 is an exploded view of an alternate form of the supporting rack in accordance with the present invention.

Further, in one embodiment of the present invention, as illustrated in FIG. 2, the first positioning unit 113 comprises a plurality of mounting screw holes 1131 located in the accommodation chamber 110 inside the hollow foot member body 11; the second positioning unit 131 comprises a plurality of mounting through holes 1311 located in each binding member 13 and respectively fastened to the mounting screw hole 1131 by screws. In another embodiment of the present invention, as illustrated in FIG. 3, the first positioning unit 113 comprises a plurality of plug holes 1132 located in the accommodation chamber 110 inside the hollow foot member body 11; the second positioning unit 131 comprises a plurality of plug rods 1312 located at each binding member 13 and respectively plugged into the plug hole 1132. It is to be understood that various other equivalent techniques can be selectively used to substitute for the for the plug holes 1132 of the first positioning unit 113 and the plug rods 1312 of the second positioning unit 131 for fastening the hollow foot member body 11 and the binding member 13 together.

Further, the foot member cover 12 of each foot member 1 has a protruding block 122 protruded from an outer wall thereof. Further, a U-shaped holder member 14 is fastened to an outer wall of the hollow foot member body 11 of one foot member 1. The U-shaped holder member 14 defines therein a holding chamber 140. Further, electrical jacks 15 are mounted in the hollow foot member body 11 of the other foot member 1. Further, a circuit module 151 is mounted in the accommodation chamber 110 of the hollow foot member body 11 of the other foot member 1 that carries the electrical jacks 15. The circuit module 151 is electrically coupled with the electrical jacks 15. Further, the foot member 1 that carries the holder member 14 comprises a plurality of engagement holes 114. The holder member 14 comprises a plurality of engagement blocks 141 respectively press-fitted into the respective engagement holes 114 of the foot member 1.

Further, the aforesaid electrical jacks 15 in the present preferred embodiment are USB jacks. However, in actual application, these electrical jacks 15 can be speaker jacks, earphone jacks, microphone jacks, memory card jacks, chip card jacks, and/or other computer peripheral jacks. The design of the electrical jacks 15 and circuit module 151 is adapted for electric connection with an external computer or server. Because the connection between the electrical jacks 15, the circuit module 151 and an external computer or server can easily be achieved using conventional techniques, no further detailed description in this regard will be given.

Further, the electrical jacks 15 can be power jacks for charging application, however, because the connection between the electrical jacks 15 and an external power source can easily be achieved using an electrical cable or other conventional techniques, no further detailed description in this regard will be given.

Further, the tabletop 3 can be made of a plastic plate. Wood, glass, or and any other hard material can also be selectively used for making the tabletop 3.

Figure 4:
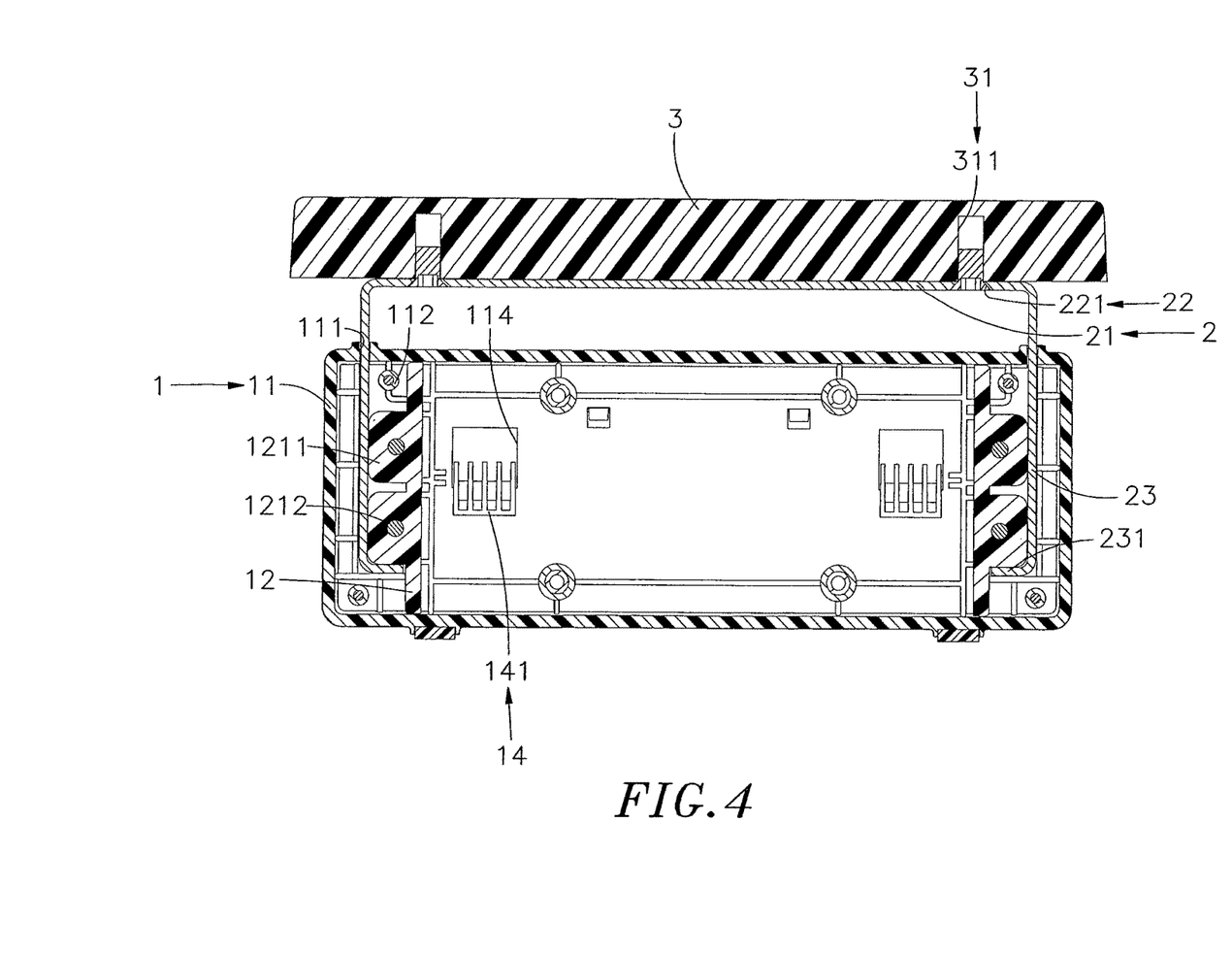
FIG. 4 is a sectional view taken along line A-A of FIG. A.
Figure 5:
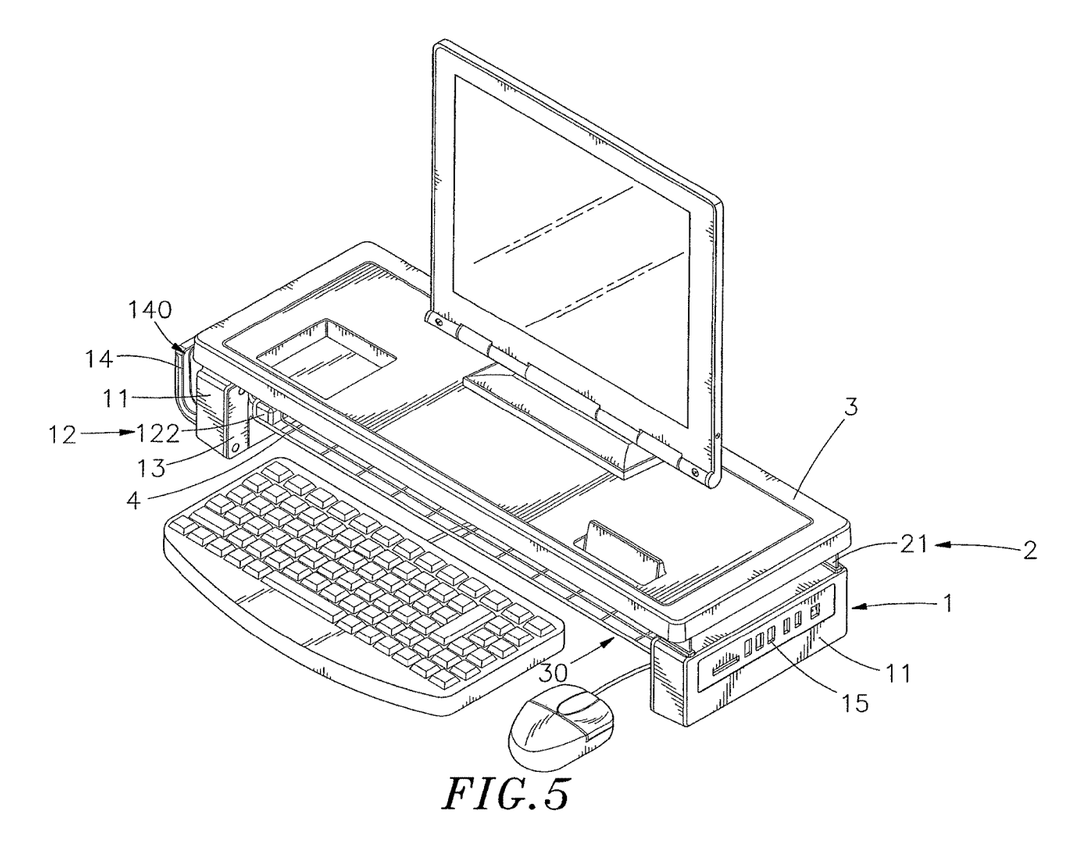
FIG. 5 illustrates an application example of the supporting rack in accordance with the present invention.
Figure 6:
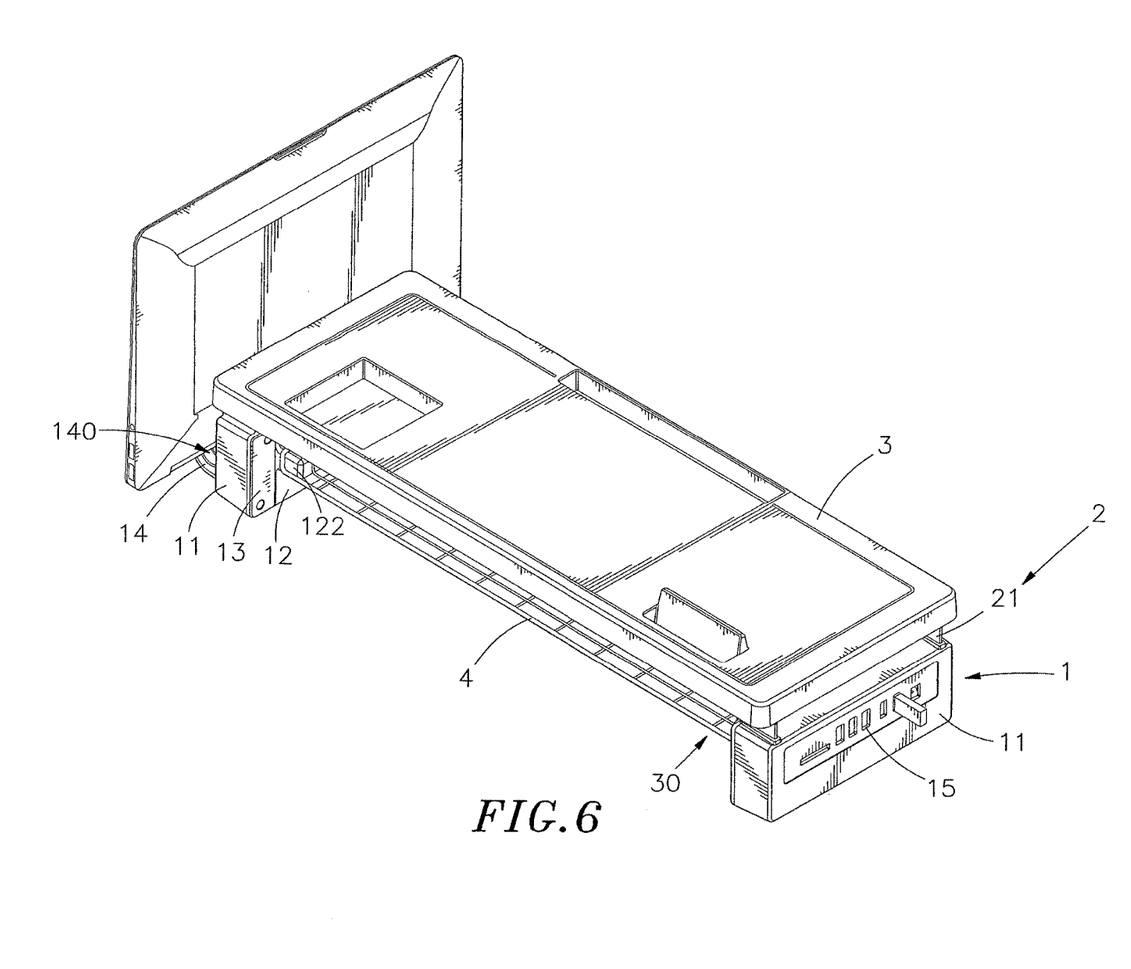
FIG. 6 illustrates another application example of the supporting rack in accordance with the present invention.

Referring to FIGS. 4-6, when assembling the supporting rack, mount the support members 2 on the foot members 1 respectively by: unfastening the binding members 13 of the foot members 1 from the respective hollow foot member bodies 11, and then inserting the legs 23 of the support members 2 through the openings 1101 of the hollow foot member bodies 11 of the respective foot members 1 into the respective mounting slots 111 of the hollow foot member bodies 11 of the respective foot members 1 to hook the locating tips 231 of the locating tips 231 of the legs 23 of the support members 2 in a bottom side in the respective accommodation chambers 110 of the hollow foot member bodies 11 of the respective foot members 1, and then using a hand tool to drive screws through the mounting through holes 1311 of the two binding members 13 into the respective mounting screw holes 1131 of the hollow foot member bodies 11 of the respective foot members 1 to affix the two binding members 13 to the hollow foot member bodies 11 of the respective foot members 1. Thus, the support members 2 and the foot members 1 are assembled. Thereafter, place the two foot members 1 on a flat surface in a parallel manner with a predetermined distance defined therebetween, and then place the tabletop 3 on the two foot members 1 to keep the mounting screw holes 311 of the mating mounting portions 31 of the tabletop 3 in alignment with the respective mounting through holes 221 of the mounting portions 22 of the support members 2, and then use a hand tool to drive screws upwardly through the respective mounting through holes 221 into the respective mounting screw holes 311 to fixedly fasten the tabletop 3 and the two foot members 1 together. At this time, the user can place a computer screen on the top surface of the tabletop 3. Further, a receiving space 30 is defined between the two foot members 1 beneath the tabletop 3 for accommodating computer peripheral apparatuses such as keyboard, mouse, etc., saving tabletop surface space and keeping the tabletop neat.

After installation of the supporting rack, a shelf 4 can be mounted on the protruding blocks 122 of the two foot members 1 for holding things (such as mobile phone, and other person items), saving tabletop space and keeping tabletop neat.

Figure 7:
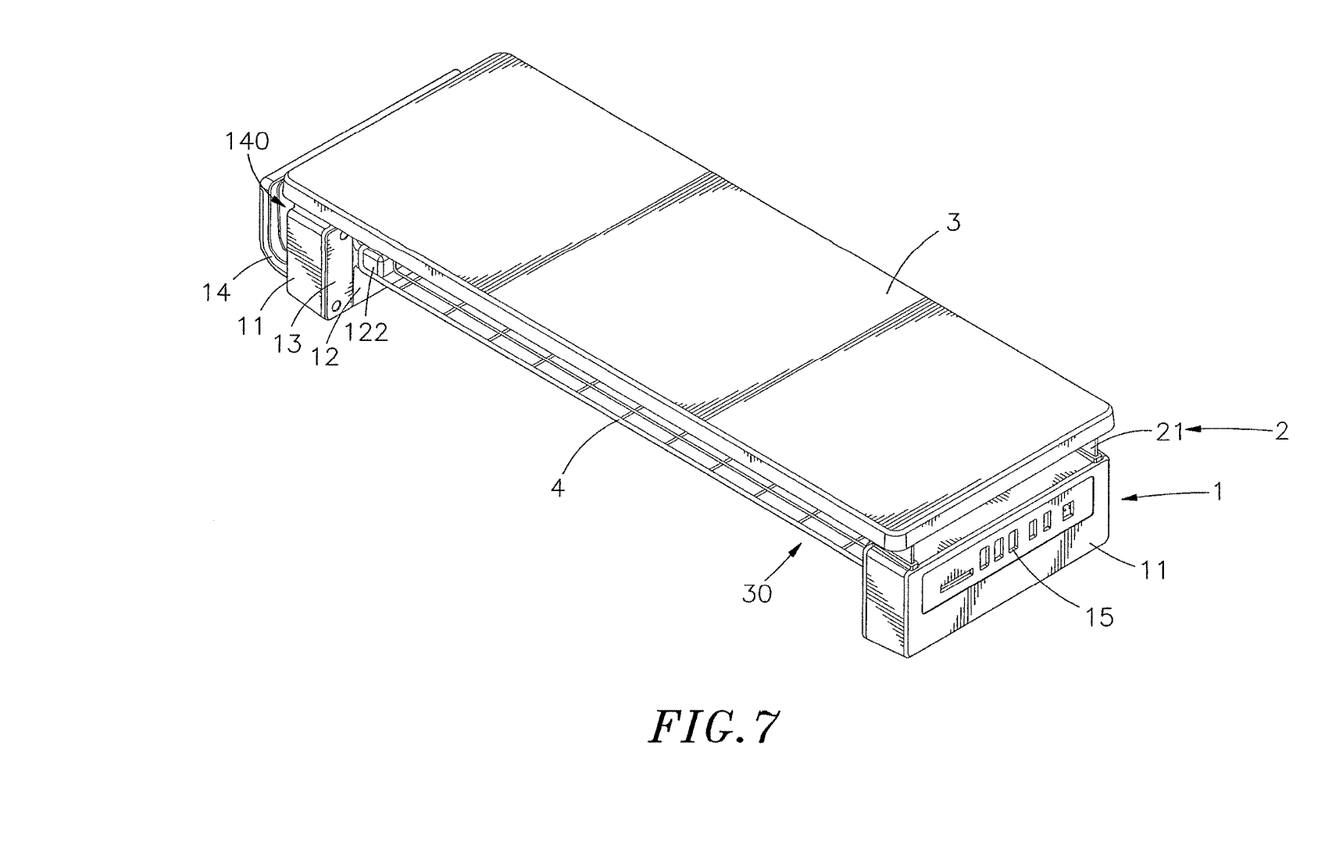
FIG. 7 is an elevational view of still another alternate form of the supporting rack in accordance with the present invention.

Referring to FIG. 7, the user can use a hand tool to unfasten the screws from the mounting screw holes 311 of the mating mounting portions 31, and then remove the tabletop 3 from the support members 2, and then fasten another tabletop 3 of a different outer appearance to the support members 2 as a substitute. Thus, different designs of tabletop 3 can be provided for selection and replacement, increasing the applicability of the invention and enhancing the consumer's desire to buy the product.

Further, the invention allows adjustment of the elevational distance between the tabletop 3 and the foot members 1. In adjustment, use a hand tool to dismount the two binding members 13 from the hollow foot member bodies 11 of the respective foot members 1, and then remove the support members 2 out of the accommodation chambers 110 of the respective hollow foot member bodies 11, and then lift each support member 2 relative to the associating foot member 1 to the desired elevation to let the locating tips 231 of the two legs 23 of each support member 2 be respectively stopped at selected locating blocks 1211 at the cover base 121 of the associating foot member cover 12, and then fasten the two binding members 13 of each foot member 1 to the associating hollow foot member body 11, and thus, the tabletop 3 is held at the desired elevation above the foot members 1.

Further, as described above, the U-shaped holder member 14 is fastened to the outer wall of the hollow foot member body 11 of one foot member 1. The user can put a portable electronic device (such as tablet computer) in the holding chamber 140 of the holder member 14, saving tabletop space. Further, a display screen can be held in the holding chamber 140 of the holder member 14 so that a person can watch the display of the display screen from one lateral side, increasing the applicability of the present invention.

Further, the electrical jacks 15 at one foot member 1 can be made in any of a variety of forms, such as USB jacks, Mini USB jacks, power jacks, etc. for the connection of the cables of various computer peripheral apparatuses, and one electrical jack 15 can be selectively used for the connection of the cable of a computer or server, enabling the installed computer peripheral apparatuses to be linked to the computer or server. In application, the computer or server can be placed on the floor, and the supporting rack can be placed on the desk. Thus, the user does not need to bend the body in connecting various computer peripheral apparatuses to the computer or server, and can conveniently connect the cables of various computer peripheral apparatuses to the electrical jacks 15 at one foot member 1 of the supporting rack to establish linking between these various computer peripheral apparatuses and the computer or server. Therefore, the supporting rack of the present invention has the advantages of increased applicability and system expandability, meeting the needs of the market.

In conclusion, the invention provides a supporting rack, which comprises two foot members 1, two support members 2 vertically adjustably mounted on the respective foot members 1, and a tabletop 3 detachably supported on the support members 2, and a U-shaped holder member 14 fastened to one foot member 1 with a holding chamber 140 defined therein for holding, for example, a portable electronic device.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A supporting rack, comprising:
   two foot members arranged in parallel, each said foot member comprising a hollow foot member body, a foot member cover and two binding members fastened to said hollow foot member body to secure said foot member cover to said hollow foot member body, said hollow foot member body comprising a plurality of mounting slots transversely located in a top wall thereof, an accommodation chamber defined therein and an opening defined in an inner lateral side thereof in communication with said accommodation chamber, said foot member cover being adapted for covering said opening of said hollow foot member body, said foot member cover comprising a cover base inserted through said opening into said accommodation chamber and a plurality of locating blocks symmetrically extended from two opposite lateral sides of said cover base at different elevations and engaged into the inside of said hollow foot member body, said two binding members being detachably fastened to said hollow foot member body at two opposite sides to secure said foot member cover to said hollow foot member body;

two support members vertically adjustably mounted on the respective said foot members, each said support member comprising a base panel suspended above the associating said support member, a plurality of mounting portions located at said base panel, two legs respectively and perpendicularly extended from two opposite ends of said base panel and respectively removably inserted through said mounting slots of said hollow foot member body of the respective said foot member into the associating said accommodation chamber, and two locating tips respectively inwardly extended from respective distal ends of said legs and selectively stoppable at an inner bottom wall of said hollow foot member body of the associating said foot member or one respective said locating block of said foot member cover of the associating said foot member; and a tabletop detachably fastened to said support members in horizontal, said tabletop comprising a plurality of mating mounting portions bilaterally and symmetrically located on a bottom wall thereof and respectively detachably fastened to said mounting portions of said support members, said tabletop defining a receiving space between said two foot members beneath the bottom wall thereof.

2. The supporting rack as claimed in claim 1, wherein said hollow foot member body of each said foot member further comprises a plurality of locating holes located in the associating said accommodation chamber; said foot member cover of each said foot member further comprises a plurality of through holes respectively defined in the locating blocks of the cover base thereof and respectively affixed to said locating holes of the associating said hollow foot member body with screws.

3. The supporting rack as claimed in claim 1, wherein each said foot member further comprises a first positioning unit located in said accommodation chamber of the said hollow foot member body thereof, and a second positioning unit located at each said binding member for fastening to said first positioning unit to secure the respective said foot member cover and the respective said hollow foot member body together.

4. The supporting rack as claimed in claim 3, wherein said first positioning unit comprises a plurality of mounting screw holes located in a bottom wall of said accommodation chamber; said second positioning unit comprises a plurality of mounting through holes respectively fastened to the respective said mounting screw holes with respective screws.

5. The supporting rack as claimed in claim 3, wherein said first positioning unit comprises a plurality of plug holes symmetrically disposed at two opposite lateral sides in the associating said accommodation chamber; said second positioning unit comprises a plurality of plug rods respectively press-fitted into the respective said plug holes.

6. The supporting rack as claimed in claim 1, wherein said foot member cover of each said foot member comprises a protruding block protruded from an outer wall thereof; the supporting rack further comprises a shelf mountable on said protruding blocks of said two foot members for holding things beneath said tabletop, a U-shaped holder member fastened to an outer wall of said hollow foot member body of one said foot member, said U-shaped holder member defining therein a holding chamber, a circuit module mounted in said accommodation chamber of said hollow foot member body of the other said foot member, and a plurality of electrical jacks mounted in said hollow foot member body of the other said foot member and electrically connected to said circuit module.

7. The supporting rack as claimed in claim 6, wherein said hollow foot member body of the other said foot member comprises a plurality of engagement holes; said holder member comprises a plurality of engagement blocks respectively press-fitted into the respective said engagement holes of the other said foot member.

8. The supporting rack as claimed in claim 6, wherein one said electrical jack is a power jack.

9. The supporting rack as claimed in claim 6, wherein at least one said electrical jack is a USB jack.

10. The supporting rack as claimed in claim 1, wherein said mounting portions of said support members are mounting through holes; said mating mounting portions of said tabletop are mounting screw holes respectively fastened to said mounting through holes of said support members with respective screws.

* * * * *